US012683057B2

(12) United States Patent
Ono

(10) Patent No.: US 12,683,057 B2
(45) Date of Patent: Jul. 14, 2026

(54) COIL COMPONENT, CIRCUIT BOARD ARRANGEMENT AND ELECTRONIC EQUIPMENT

(71) Applicant: TAIYO YUDEN CO., LTD., Tokyo (JP)

(72) Inventor: Kenji Ono, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 853 days.

(21) Appl. No.: 18/063,620

(22) Filed: Dec. 8, 2022

(65) Prior Publication Data

US 2023/0197327 A1 Jun. 22, 2023

(30) Foreign Application Priority Data

Dec. 22, 2021 (JP) ................................ 2021-207880

(51) Int. Cl.
*H01F 27/28* (2006.01)
*H01F 27/06* (2006.01)
(Continued)

(52) U.S. Cl.
CPC ............. *H01F 27/06* (2013.01); *H01F 27/29* (2013.01); *H01F 41/06* (2013.01); *H01F 2027/065* (2013.01)

(58) Field of Classification Search
CPC .......... H01F 27/06; H01F 27/29; H01F 41/06; H01F 2027/065; H01F 2017/048; H01F 17/045; H01F 27/2828; H01F 27/292
(Continued)

(56) References Cited

U.S. PATENT DOCUMENTS

2004/0263285 A1* 12/2004 Suzuki .................. H01F 41/082 333/185
2019/0189337 A1* 6/2019 Kawasaki ............... H01F 27/24
(Continued)

FOREIGN PATENT DOCUMENTS

JP 2005322688 A * 11/2005
JP 2009147159 A 7/2009
JP 2020072157 A 5/2020

OTHER PUBLICATIONS

A Notice of Reasons for Refusal issued by the Japanese Patent Office, mailed Oct. 7, 2025, for Japanese counterpart application No. 2021-207880. (5 pages).
(Continued)

*Primary Examiner* — Shawki S Ismail
*Assistant Examiner* — Kazi S Hossain
(74) *Attorney, Agent, or Firm* — Law Office of Katsuhiro Arai

(57) ABSTRACT

A coil component includes at least one outer electrode, an element body and a conductor. The element body includes a first surface on which at least a portion of each of the outer electrode(s) is provided, a second surface immediately adjacent to the first surface, a core portion extending from the second surface in axial direction of the core portion, and a recess having a curved concave surface replacing at a portion of a ridge line between the first surface and the second surface. The conductor includes a winding portion that extends around a periphery of the core portion of the element body, a junction portion that is electrically joined to the outer electrode at the first surface, and a lead portion that passes through the recess and connects one end of the winding portion to the junction portion via the recess.

13 Claims, 17 Drawing Sheets

(51) Int. Cl.
*H01F 27/29* (2006.01)
*H01F 41/06* (2016.01)

(58) Field of Classification Search
USPC .................................. 336/192, 200, 232, 198
See application file for complete search history.

(56) References Cited

U.S. PATENT DOCUMENTS

| | | | | |
|---|---|---|---|---|
| 2020/0135385 | A1* | 4/2020 | Shimizu | H01F 27/2828 |
| 2020/0211750 | A1* | 7/2020 | Miyamoto | H01F 17/045 |
| 2020/0251276 | A1* | 8/2020 | Nishimura | H01F 27/292 |
| 2022/0122762 | A1* | 4/2022 | Tsujibayashi | H01F 27/24 |

OTHER PUBLICATIONS

A Decision of Refusal issued by the Japanese Patent Office, mailed Feb. 3, 2026, for Japanese counterpart application No. 2021-207880. (6 pages).

* cited by examiner

FIG. 14C
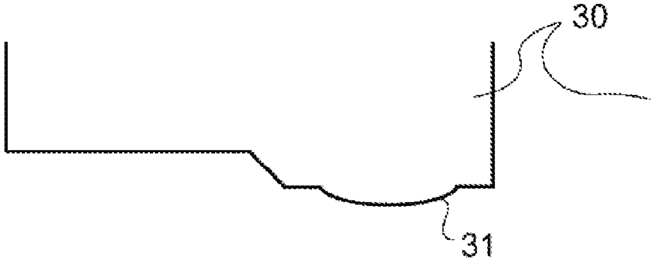
FIG. 14D
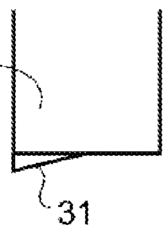
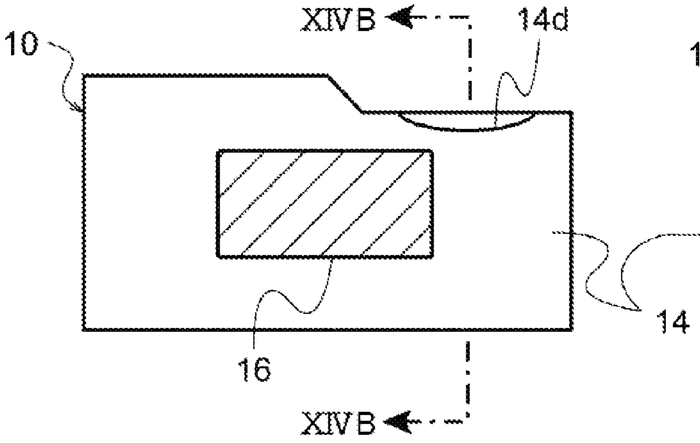
FIG. 14A
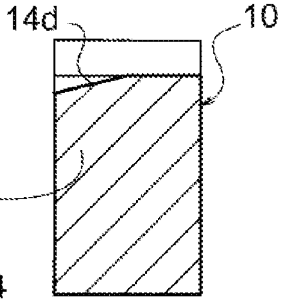
FIG. 14B

COIL COMPONENT, CIRCUIT BOARD ARRANGEMENT AND ELECTRONIC EQUIPMENT

FIELD OF THE INVENTION

This invention relates to coil components, circuit board arrangements and electronic devices.

DESCRIPTION OF THE RELATED ART

Electronic devices such as communication equipment are becoming more sophisticated, and this trend requires that components of the electronic devices be smaller and sophisticated. When electronic components should be small, the thickness of an outer electrode is restricted. As a result, metal material of the outer electrode is often applied directly onto the surface of the component body by coating or plating.

Size reduction is also required for winding-wire-type coil component, in which wires are wound around an element body to form a conductor. In the winding-wire-type coil component, stable connection of the winding wire to the outer electrode is required.

For example, JP2009-147159A discloses a winding-wire-type coil component that uses a drum core. Each of two lead portions of the winding wire is placed on an inclined surface of a flange portion (enlarged portion) of the coil component to suppress damage to the lead portion.

SUMMARY OF THE INVENTION

JP2009-147159A requires that the lead portion be in a specific position relative to the inclined plane, but the thickness or diameter of the wire varies with the structure of the winding-wire-type coil component, and the specifications of the wire are changed according to the inductance. In most cases, the position of the lead portion relative to the inclined plane is different from the above-mentioned specific position. For this reason, the configuration disclosed in JP2009-147159A is not effective in suppressing damage when the lead portion is far from the brim due to the changes made to the wire specifications, etc., and the performance of the coil component may become unstable due to wire damage. In addition, the configuration disclosed in JP2009-147159A has a possibility that the wire wound around the element body may loosen and destabilize the performance of the coil component when the lead portion is far from the brim.

An object of this invention is to provide a coil component with stable performance regardless of the position of a lead portion of a winding wire of the coil component. Another object of this invention is to provide a circuit board arrangement, which includes a coil component with stable performance regardless of the position of a lead portion. Still another object of this invention is to provide an electronic device, which includes a coil component with stable performance regardless of the position of a lead portion.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a coil component which includes at least one outer electrode, an element body and a conductor. The element body includes a first surface on which at least a portion of each of the outer electrode(s) is provided, a second surface immediately adjacent to the first surface, a core portion extending from the second surface in an axial direction of the core portion, and a recess having a curved concave surface replacing a portion of a ridge line between the first surface and the second surface. The conductor includes a winding portion that extends around a periphery of the core portion of the element body, a junction portion that is electrically joined to the outer electrode at the first surface, and a lead portion that passes through the recess and connects one end of the winding portion to the junction portion via the recess.

A boundary where the recess connects to at least one of the first and second surfaces may be curved.

The recess may be larger in size when viewed toward the first surface than when viewed toward the second surface.

The conductor may include a wire. A radius of curvature at the curved concave surface of the recess may be greater than a radius of the wire.

A depth of the recess from the first surface may be smaller than a diameter of the wire.

A boundary where the recess connects to the second surface may be curved. The lead portion may pass over the boundary of the recess at a position shifted toward a starting point of the lead portion on the winding portion with respect to a farthest point (apex) of the boundary from the first surface as viewed in the axial direction of the core portion.

The conductor may include a wire of 0.02 mm or less in diameter.

The coil component may further include a second outer electrode. The element body may include another first surface on which at least a portion of the second outer electrode is located, another second surface immediately adjacent to said another first surface, and another recess on a distal end of the core portion. Said another recess may have a curved concave surface replacing a portion of a ridge line between said another first surface and said another second surface. The conductor may have another junction portion that is electrically connected to the second outer electrode at said another first surface and another lead portion that passes through said another recess and connects the other end of the winding portion to said another junction portion via said another recess.

The recess and said another recess may be arranged opposite to each other or may be arranged in rotational symmetric positions.

According to another aspect of the present invention, there is provided a circuit board arrangement that includes the above-described coil component and a board on which the coil component is mounted by solder joints through the outer electrode.

According to still another aspect of the present invention, there is provided an electronic device that includes the above-mentioned circuit board arrangement.

According to yet another aspect of the present invention, there is provided a method of manufacturing the above-described coil component. The method includes forming the element body having the first surface, the second surface, and the core portion, forming the recess by barrel-polishing the element body, forming the conductor by winding the wire around the winding core of the element body in which the recess is formed, and forming the outer electrode.

In the method of manufacturing the coil component, the junction portion may be joined to the outer electrode by pressure and heat.

According to this invention, performance of the coil component is stable regardless of the position of the lead portion.

BRIEF DESCRIPTION OF THE DRAWINGS

FIG. 14A to FIG. 14D are a series of views useful to describe an exemplary method of making an element body.

DETAILED DESCRIPTION OF EMBODIMENTS

The following is a detailed description of embodiments of the invention with reference to the accompanying drawings. The following embodiments are not intended to limit the invention, and not all of the combinations of features described in the embodiments are essential for the configuration of the invention. The configuration of the embodiments may be modified or changed if necessary depending on the specifications of the device to which the invention is applied and various conditions (conditions of use, environment of use, etc.). The technical scope of the invention is defined by the claims and is not limited by the following individual embodiments. The drawings used in the following description may differ in scale and shape from the actual structure in order to make each configuration easier to understand. The components shown in one of the drawings may be referred to in the description of other drawings.

Appearance of a Coil Component

Figure 1:
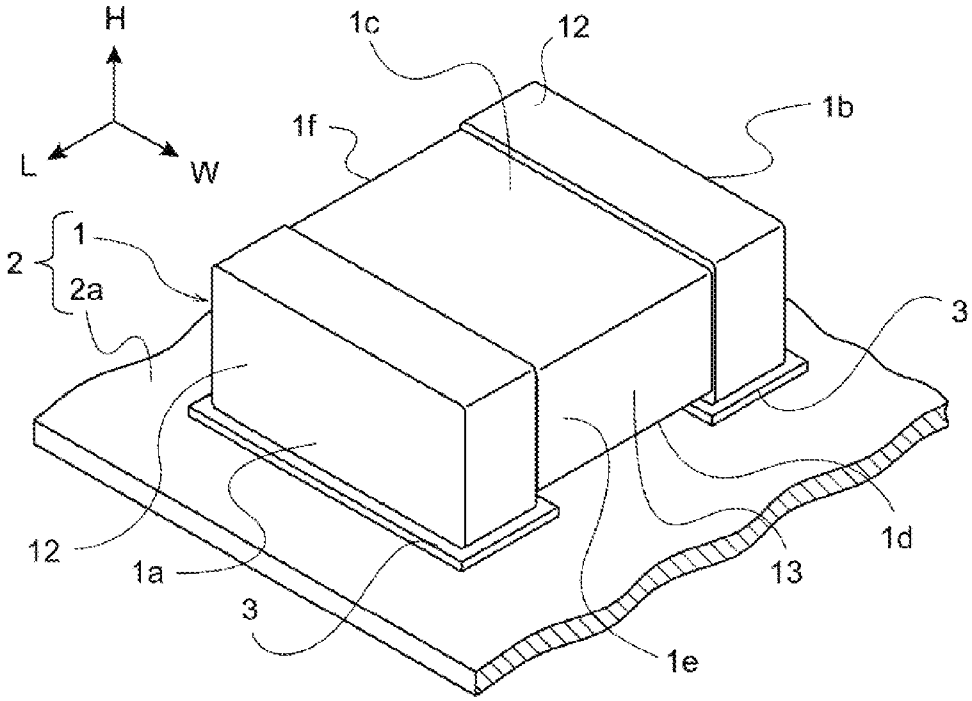
FIG. 1 is a perspective view of a coil component according to one embodiment of the invention.

FIG. 1 shows a perspective view of one embodiment of the coil component 1 according to the present invention.

The coil component 1 has two outer electrodes 12 and is mounted on a substrate or board 2*a*. The substrate 2*a* has two land portions 3 on an upper surface thereof. The coil component 1 is mounted on the substrate 2*a* by soldering. Specifically, the two outer electrodes 12 of the coil component 1 are joined to the respective land portions 3 on the substrate 2*a* by soldering. Those faces of the outer electrodes 12 which are mounted on the substrate 2*a* (or the land portions 3) are referred to as mounting surfaces of the coil component 1.

A circuit board arrangement (circuit device) 2 includes the coil component 1 and the substrate 2*a* on which the coil component 1 is mounted. The circuit device 2 may be used in various electronic devices. Electronic devices equipped with the circuit device 2 may be smartphones, tablet devices, game consoles, automotive electrical components, servers, board computers, or other electronic devices.

The coil component 1 may be an inductor, transformer, filter, reactor, or other coil components. Alternatively, the coil component 1 may be a coupled inductor, choke coil, or other magnetically coupled coil components. Alternatively, the coil component 1 may be an inductor used in a DC/DC converter. Use and applications of the coil component 1 are not limited to those explicitly mentioned in this specification.

In the following description, unless the context otherwise requires, the description of direction is based on the "L-axis", "W-axis", and "H-axis" directions in FIG. 1. The L-axis direction may be referred to as a length direction, the W-axis direction may be referred to as a width direction, and the H-axis direction may be referred to as a height direction. The height direction may also be referred to as a thickness direction.

The coil component 1 has a rectangular parallelepiped shape when viewed from the outside. Specifically, the coil component 1 has a first end face (left face) 1*a* and a second end face 1*b* (right face) at opposite ends in the length direction of the coil component. The coil component 1 also has a first main face (top face) 1*c* and a second main face (bottom face) 1*d* at opposite ends in the height direction. The coil component 1 also has a front face 1*e* and a rear face 1*f* at opposite ends in the width direction. The coil component 1 has eight corners and twelve ridges, which connect the eight corners.

The left face 1*a*, the right face 1*b*, the top face 1*c*, the bottom face 1*d*, the front face 1*e*, and the rear face 1*f* of the coil component 1 may all be flat planar surfaces or curved surfaces. The eight corners of the coil component 1 may be rounded. The twelve ridges of the coil component 1 may be rounded.

The left face 1*a*, the right face 1*b*, the top face 1*c*, the bottom face 1*d*, the front face 1*e*, and the rear face 1*f* of the coil component 1 may be partly curved, and the corners and ridges of the coil component 1 may be rounded. Such shapes may also be referred to as a "rectangular parallelepiped shape" in this specification. In other words, the rectangular parallelepiped shape in this specification does not mean a "rectangular parallelepiped shape" in the strict mathematical sense.

Construction of the Coil Component

The coil component 1 has the outer electrodes 12 and an exterior part 13 when viewed from outside. The coil component 1 has an element body and a conductor inside. The element body may be a drum-core type, in which the conductor is wound around the surface of the element body. Alternatively, the element body may have the conductor arranged inside the element body. In the following, the element body of the drum-core type will be described.

Figure 2:
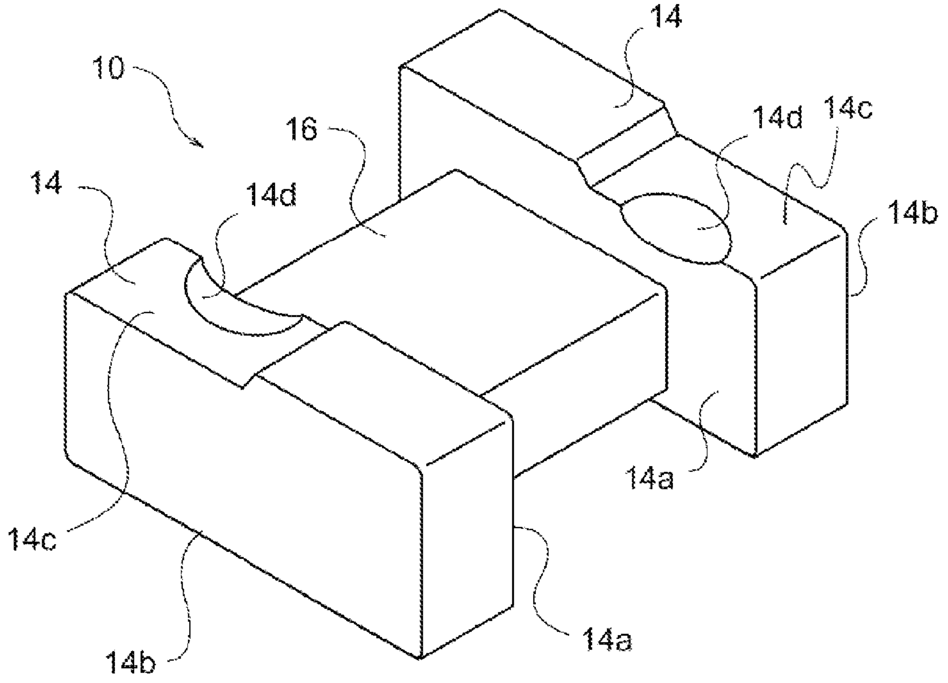
FIG. 2 is a perspective view of an element body of the coil component.
Figure 3:
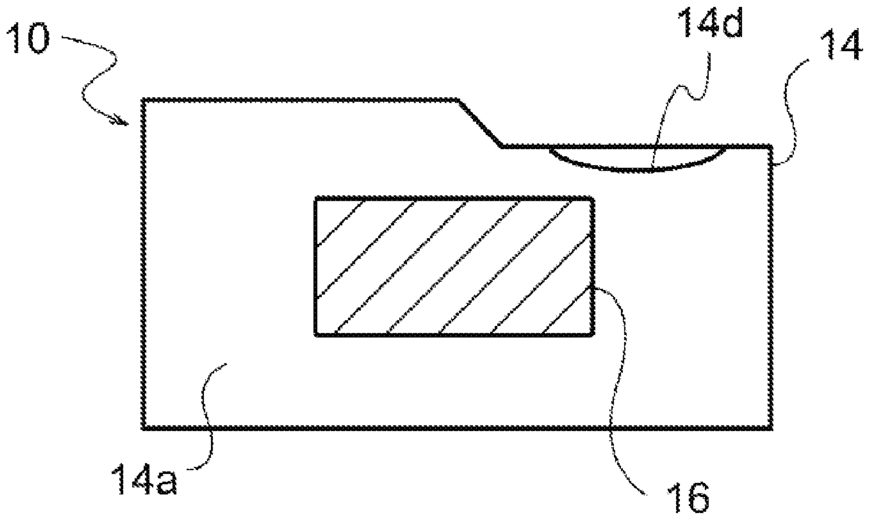
FIG. 3 shows a cross-sectional view of the element body.
Figure 4:
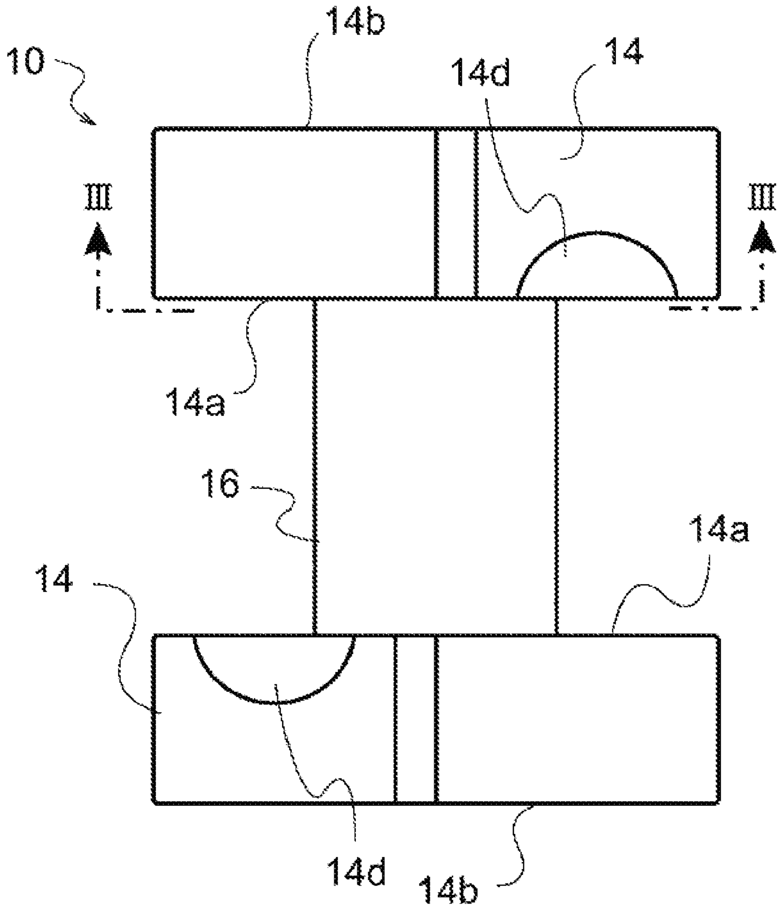
FIG. 4 shows a top view of the element body.
Figure 5:
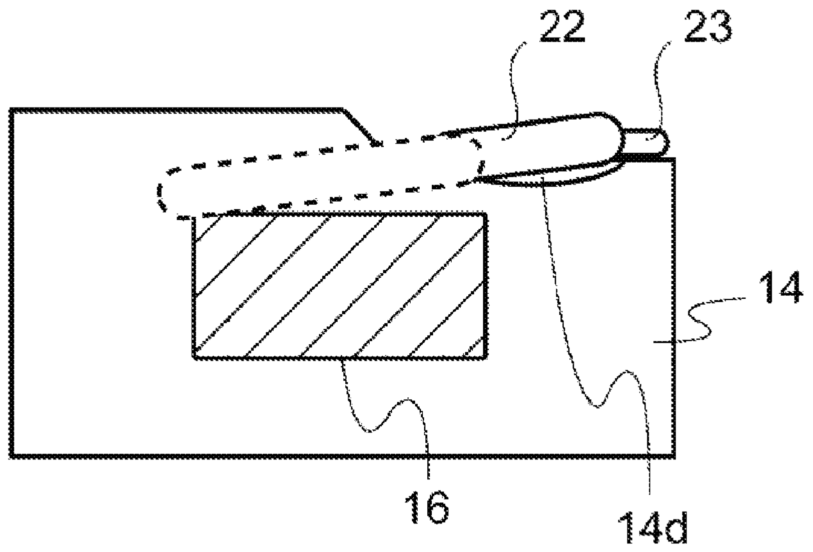
FIG. 5 shows a cross-sectional view of a conductor of the coil component.
Figure 6:
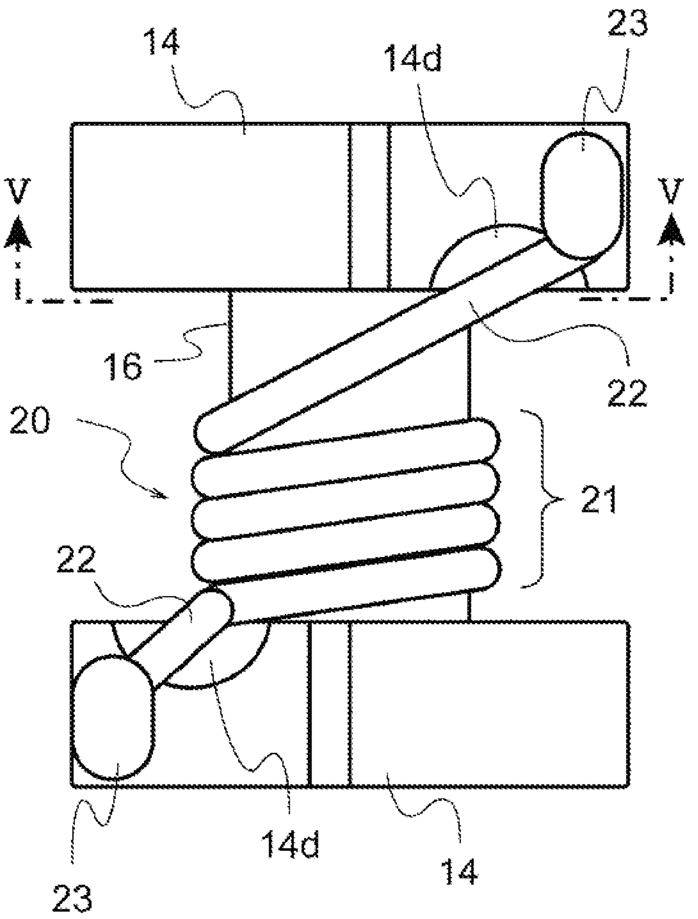
FIG. 6 is a top view of the conductor.

FIG. 2 shows the element body 10. FIG. 3 shows a cross-sectional view of the element body 10, taken along the line III-III in FIG. 4. FIG. 4 shows a top view of the element body. FIG. 5 shows a cross-sectional view of the conductor, taken along the line V-V shown in FIG. 6. FIG. 6 shows a top view of the conductor. The construction of the coil component 1 will be described with reference to FIG. 1 to FIG. 6.

The element body 10 is made of magnetic or non-magnetic materials. For example, ferrite and soft magnetic alloy materials may be used as magnetic materials for the element body 10. Alumina and glass may be used as non-magnetic materials for the element body 10. Magnetic material for the element body 10 may be various crystalline or amorphous alloy magnetic materials, or a combination of crystalline and amorphous materials.

The crystalline alloy magnetic material that may be used as magnetic material for the element body 10 contains, for example, 50 wt % or more of Fe or 85 wt % or more of Fe (iron) as a main component and contains at least one of Si (silicon), Al (aluminum), Cr (chromium), Ni (nickel), Ti (titanium), and Zr (zirconium). The amorphous alloy magnetic materials that may be used as magnetic materials for the element body 10 contains, for example, any of Si (silicon), Al (aluminum), Cr (chromium), Ni (nickel), Ti (titanium), and Zr (zirconium), in combination with B (boron) or C (carbon).

Pure iron consisting of Fe (iron) and unavoidable impurities may be used as magnetic material for the element body 10. A combination of pure iron, consisting of Fe (iron) and unavoidable impurities, and various crystalline or amorphous alloy magnetic materials may also be used as magnetic material for the element body 10. The material for the element body 10 is not limited to those explicitly mentioned in this specification, and any known material suitable for the element body may be used.

A method of manufacturing the element body 10 will be described in detail later.

The conductor 20 is made of a metallic material with excellent electrical conductivity. For example, one or more of Cu (copper), Al (aluminum), Ni (nickel), and Ag (silver) may be used as the metallic material for conductor 20, or an alloy containing any of these metals (Cu, Al, Ni and Ag) may be used as metallic material for conductor 20. The surface of conductor 20 may be provided with an insulating film. The conductor 20 is disposed on the surface of the element body 10 or inside the element body 10. A sole conductor 20 may be provided in a sole element body 10 as shown in FIG. 6. Alternatively, a plurality of conductors 20 may be provided in the sole element body 10.

The element body 10 of this embodiment is referred to as a drum core and has two flanges 14 and a winding core 16. The winding core 16 extends in the longitudinal direction (length direction) of the element body 10.

In the illustrated embodiment of the invention, the winding core 16 has a generally quadrangular prism shape (rectangular parallelepiped shape) extending in the longitudinal direction of the coil component 1. The winding core 16 may take any shape as long as the conductor 20 can extend around the winding core 16, other than the shape depicted in FIG. 2. For example, the winding core 16 may have a shape of a polygonal prism, such as a triangular, pentagonal, or hexagonal prism. Alternatively, the winding core 16 may have a shape of a round cylinder (column), an elliptical cylinder, or a truncated cone (cone having a flat top).

The flanges 14 are provided at opposite ends (right and left ends as viewed in a direction perpendicular to an axis of the winding core) of the winding core 16, respectively. Each of the flanges 14 has an inner surface **14*a* and an outer surface 14*b*. The inner surface 14*a* and the outer surface 14*b* of each of the flanges 14 extend in a direction perpendicular to the longitudinal direction of the winding core 16. It should be noted that when the terms "perpendicular," "orthogonal," and "parallel" are used in this specification, they are not used in a strictly mathematical sense. For example, when we say that the inner surface 14*a* of the flange 14 extends in a direction perpendicular to the longitudinal direction of the winding core 16 (L-axis direction), the angle between the inner surface 14*a* of the flange 14 and the longitudinal direction of the winding core 16** may be 90 degrees or may be approximately 90 degrees. The "approximately 90 degrees" includes any angle within a range of 70 degrees to 110 degrees, a range of 75 degrees to 105 degrees, a range of 80 degrees to 100 degrees, or a range of 85 degrees to 95 degrees. The terms "parallel," "orthogonal," and other mathematical terms used in this specification may also take a broader interpretation than the strict mathematical meaning, taking into account the intent, context, and technical common sense in the field to which the invention pertains.

The conductor 20 has a winding portion (round wire portion) 21 that extends around a portion of the element body 10 (e.g., the winding core 16), two opposite lead portions 22 drawn from the winding portion 21, and two junction portions 23 connected to the two outer electrodes 12, respectively. Each of the junction portions 23 is formed, for example, on the top surface **14*c* of the corresponding flange 14, and each of the lead portions 22 connects the winding portion 21 to the corresponding junction portion 23. In the winding-wire-type coil component 1, the winding portion 21 of the conductor 20 is formed by the wire extending around the circumference of the winding core 16 between the two flanges 14. The wire is, for example, 0.2 mm or less in thickness (diameter). Alternatively, the wire may be 0.1 mm or less in thickness (diameter), or even 0.02 mm or less in thickness. The conductor 20 has the lead portions 22 and the junction portions 23 on opposite ends (right end and left end) of the winding portion 21**.

Each of the outer electrodes 12 is made of a metallic material with excellent electrical conductivity. For example, Cu (copper) and/or Ag (silver) is used as the metallic material for the outer electrode 12. Alternatively, Ni (nickel) and/or Sn (tin) may be used as the metallic material for the outer electrode 12. Each of the outer electrodes 12 has a multi-layer structure. Specifically, each of the outer electrodes 12 includes a plurality of overlapping layers that have the above-mentioned metallic material(s) as their main component(s), or layers alloyed with some of the above-mentioned metallic materials. Each of the outer electrodes 12 covers, for example, each surface of the flange 14 except the inner surface 14*a*. The outer electrodes 12 are formed by a process of applying metallic materials on the flanges 14. Specifically, the outer electrodes 12 are formed by dipping, sputtering, or vapor deposition.

The coil component 1 has the exterior part 13. The exterior part 13 is provided between the two outer electrodes 12 and covers the winding portion 21 of the conductor 20. The exterior part 13 is provided such that the exterior part 13 does not affect the external dimensions of the coil component 1. The exterior part 13 need not cover the entire winding portion 21, but the exterior part 13 forms at least the upper surface 1*c* of the coil component 1. For example, the exterior part 13 may cover only the top area of the winding portion 21 (i.e., the upper area close to the top face 1*c* of the coil component 1). Alternatively, the exterior part 13 may cover an approximately upper half area of the winding portion 21. This can ensure or improve handling of the coil component 1 when a vacuum from a suction device is applied to the exterior part 13 to carry the coil component 1 to a desired location during a process of mounting the coil component 1 onto the substrate 2*a*.

The exterior part 13 is formed, for example, by filling the space between the two flanges 14 with resin. The exterior part 13 is made of resin. The resin may contain filler. Any suitable resin material used to coat the winding wire in a winding-wire-type coil component may be used as the material of the exterior part 13. Magnetic or non-magnetic materials may be used as the filler. The exterior part 13 is formed by applying a composite material including resin and filler onto the outer area of the winding portion 21 using a dispenser or the like, and then curing the resin component.

The exterior part 13 may be formed from a material other than resin. The material of the exterior part 13 other than resin is metal, ceramics, or other material. The exterior part 13 is formed, for example, by providing a foil, a plate, or a composite of the foil and the plate. The foil and the plate may be made of metal, ceramics, or other materials disposed between the two flanges 14.

General Structure of a Recess

The element body 10 has a step (higher area) on the top surface 14*c* of the flange 14 and a recess 14*d* located between the top surface 14*c* and the inner surface 14*a*. It should be noted that the flange 14 may have a flat top surface 14*c* without a step.

Figure 7:
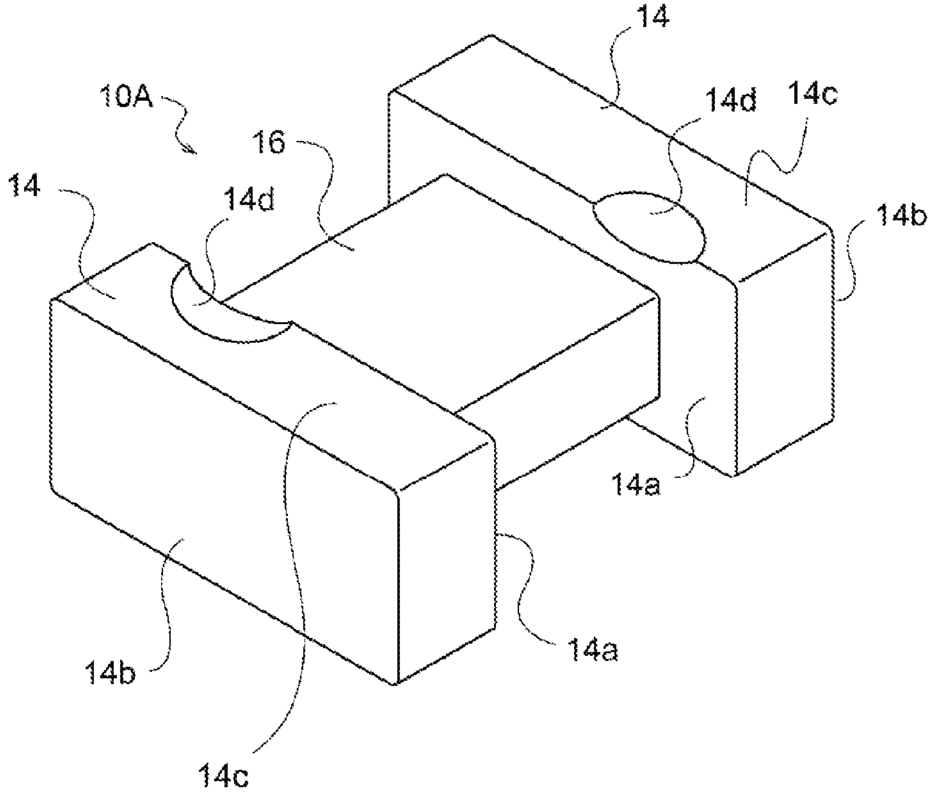
FIG. 7 shows a modification to the element body.

FIG. 7 shows a modification to the element body 10. An element body having a modified configuration is denoted by 10A.

In the element body 10A, the top surface 14*c* of each of the flanges 14 has no step. The element body 10A has the recess 14*d* located between the top surface 14*c* and the inner surface 14*a*.

In the configuration shown in FIG. 2 to FIG. 4 and the configuration shown in FIG. 7, the element body 10/10A has the flanges 14 on opposite ends of the winding core 16 and also has the recesses 14*d* in the flanges 14. The inner surface 14*a* of the right flange 14 faces the inner surface 14*a* of the left flange 14. In the element body 10/10A, the recesses 14*d* open on the opposite inner surfaces 14*a* respectively, and may diagonally face each other. More precisely, the two recesses 14*d* are in a point symmetrical arrangement.

Each of the recesses 14*d* has a continuous curved surface that is convex toward the interior of the flange 14. The continuous curved surface is defined by part of a spherical, cylindrical, or conical surface, for example. The recess 14*d* has one edge on the top surface 14*c* and another edge on the inner surface 14*a*. Each of the edges of the recess 14*d* is a continuous curve, such as a circular arc, a regular oval arc, or a non-regular oval arc.

The two recesses 14*d* in the flanges 14 are used as the positioning features for the two lead portions 22, respectively, such that loosening of the wire is prevented or suppressed during and after formation of the conductor 20. Thus, the recesses 14*d* contribute to the performance stability of the coil component 1.

Figure 8:
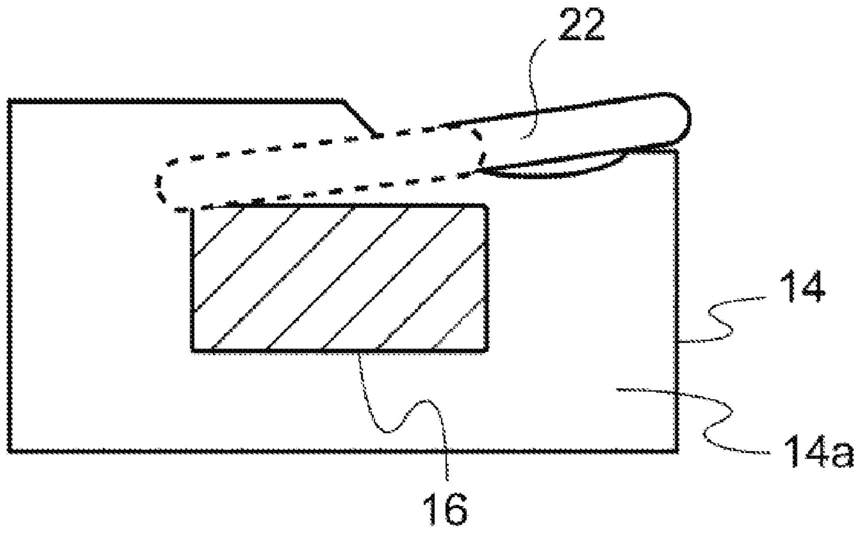
FIG. 8 shows a cross-sectional view of the conductor during a process of making the conductor.
Figure 9:
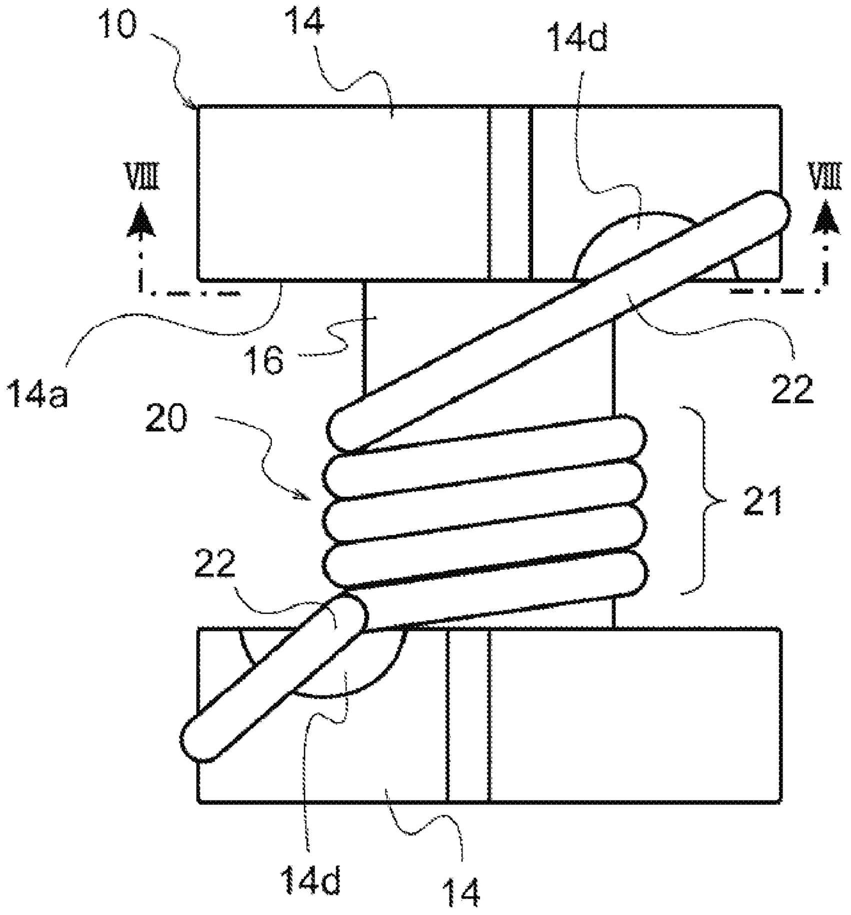
FIG. 9 shows a top view of the conductor during the process of making the conductor.

FIG. 8 shows a cross-sectional view of the conductor 20 during the formation of the conductor 20, taken along the line VIII-VIII in FIG. 9. FIG. 9 shows a top view of the conductor 20 during the formation thereof.

The element body 10 is provided with a base layer (not shown) on each surface except the inner surface 14*a* of each of the flanges 14. The base layer is part of the outer electrode 12.

During the formation of the conductor 20, the wire is wound around the core 16 for a predetermined number of turns to form the winding portion 21. Then, the lead portions 22 are drawn from the winding portion 21 and hooked to the recesses 14*c* of the flanges 14, respectively. The end of each of the lead portions 22 is joined to the base layer of the outer electrode 12 on the top surface 14*c* of the associated flange 14. The joining forms the joint portion 23 on each of the flanges 14, as shown in FIG. 6.

When the lead portion 22 is hung in (hooked to) the recess 14*d*, tension is applied to the lead portion 22 while the edge of the lead portion 22 is placed on the top surface 14*c* of the flange 14. As a result, the lead portion 22 is positioned such that the lead portion 22 contacts the edge of the continuous curve or the continuous curved surface of (or in) the recess 14*d* to connect the winding portion 21 to the joint portion 23 by the shortest distance. Because the lead portion 22 connects the winding portion 21 to the joint portion 23 by the shortest way, loosening of the lead portions 22 and the winding portion 21 is suppressed during and after the formation of the conductor 20. Thus, the position of the wire is stabilized. In addition, extra DC resistance is also suppressed because the lead portion 22 connects the winding portion 21 to the joint portion 23 by the shortest distance.

The positioning of the lead portion 22 by the recess 14*d* also stabilizes the position of the joint portion 23. As a result, the coil component 1 has stable electrical characteristics such as stable inductance, and experiences little change in characteristics over time, which would otherwise be caused by loosening of the wire.

The two recesses 14*d* are formed in the two flanges (right flange and left flange) 14 respectively, and the lead portions 22 at both ends of the conductor 20 are positioned by the recesses 14*d*. Thus, it is possible to suppress or prevent the wire from loosening, etc., compared to the configuration where only one lead portion is fixed at one end of the conductor. As shown in FIG. 4, the recesses 14*d* on both sides of the element body 10 are positioned symmetrically when viewed toward the top surface 1*c* of the coil component 1. Therefore, the lead portions 22 are disposed in the same arrangement on both sides of the element body 10, and the effects of suppressing loosening of the wire achieved by the two lead portions 22 are the same. In addition, because the recesses 14*d* on both sides of the element body 10 are arranged in opposing positions (i.e., the recesses 14*d* are arranged in rotational symmetric positions), the lead portions 22 are installed on both sides in the same manner. This further enhances the effect of suppressing or preventing the loosening of the wire.

The joint portion 23 is joined to the base layer by thermocompression. Pressure is applied to the wire during the thermocompression such that the pressure flattens or crushes the wire and increases the contact area. Also, heating of the thermocompression partially melts the base layer or partially alloys the wire and the base layer, resulting in a strong bond. As the lead portion 22 bends at the edge of the recess 14*d* or at other areas, and the wire is flattened, the movement of the lead portion 22 toward the winding portion 21 is strongly restrained.

The joint portion 23 of the conductor 20 may be fixed to the outer electrode 12 by various known methods other than thermocompression bonding. For example, the joint portion 23 may be fixed to the outer electrode 12 by metal brazing, adhesion with a conductive resin layer, or pinching with a metal plate, or a combination thereof.

After the joint portion 23 is formed, a conductive resin layer or plating layer is provided on the surface of the base layer to form the outer electrode 12. As a result, the joint portion 23 is integrated with the outer electrode 12. The joint portion 23 may be formed on the mounting surface of the outer electrode 12 or on a surface different from the mounting surface.

Complex processing to the element body 10 may hinder downsizing of the coil component 1 and may increase costs due to complexity of the mold, for example. In addition, providing complex shapes or large irregularities in the element body 10 may decrease the mechanical strength of the element body 10 and may increase damage to the conductor 20. Therefore, when the coil component 1 is a small component, it is desirable that the coil component 1 undergo machining to a minimum. As will be described below, the structure of the recess 14*d* of this embodiment avoids the above-mentioned restrictions and contributes to downsizing of the coil component 1.

Details of the Recess

The detailed structure of the recess 14*d* will be described below.

Figure 10A:
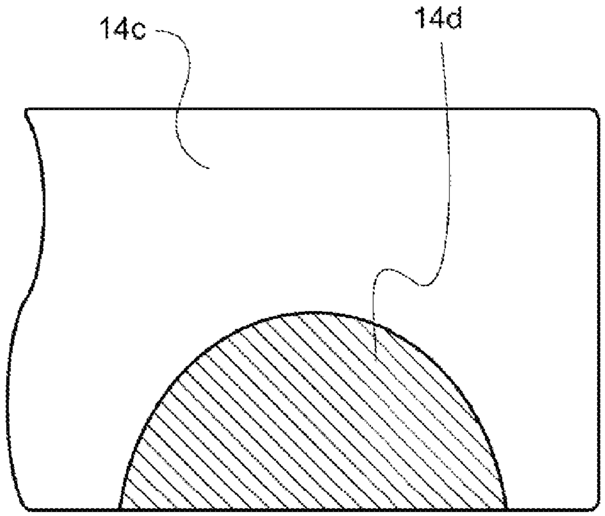
FIG. 10A is an enlarged top view of a recess.
Figure 10B:
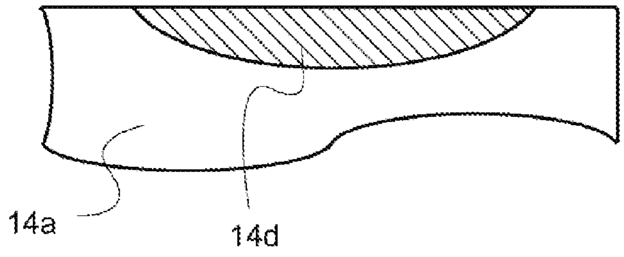
FIG. 10B is an enlarged left side view of the recess.
Figure 11A:
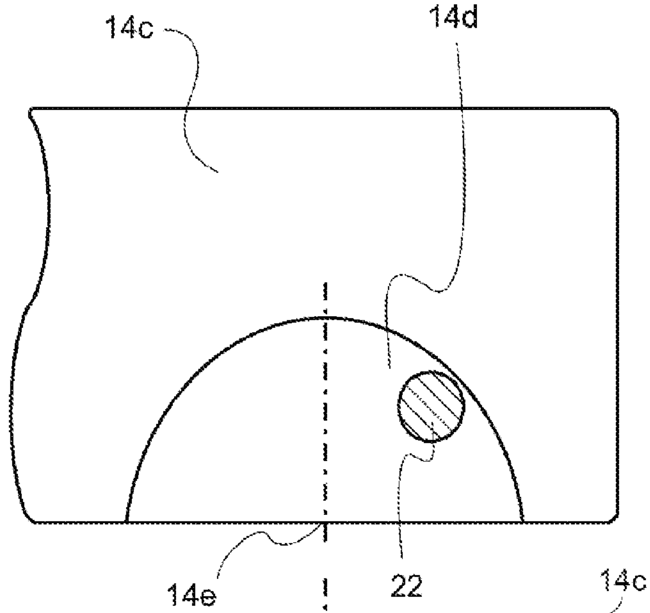
FIG. 11A is similar to FIG. 10A and shows a top view of the recess together with a lead portion hanging in the recess.
Figure 11B:
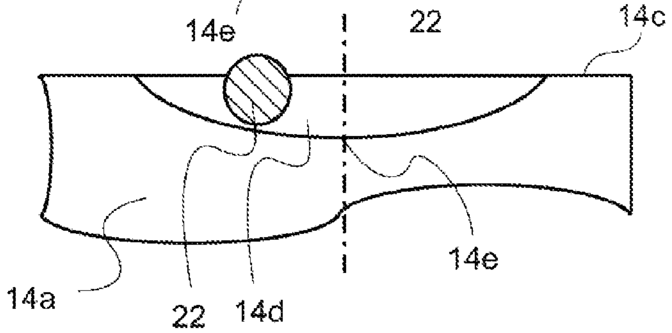
FIG. 11B is similar to FIG. 10B and shows a left side view of the recess together with the lead portion hanging in the recess.

Each of FIG. 10A and FIG. 10B is an enlarged view of the recess 14*d*, and each of FIG. 11A and FIG. 11B is an enlarged view of the lead portion 22 that hooks to the recess 14*d*.

FIG. 10A shows a top view of the recess 14*d* when viewed toward the top surface 14*c* of the flange 14. FIG. 11A also shows a top view of the recess 14*d* when viewed toward the top surface 14*c* of the flange 14. FIG. 10B shows a view of the recess 14*d* from the inside when viewed toward the inner surface 14*a* of the flange 14. FIG. 11B also shows a view of the recess 14*d* from the inside when viewed toward the inner surface 14*a* of the flange 14.

The recess 14*d* is larger in size when viewed toward the top surface 14*c* than when viewed toward the inner surface 14*a*. In other words, the recess 14*d* is a wide and shallow depression when viewed toward the top surface 14*c*. The depth from the top surface 14*c* to the bottom of the recess 14*d* is small. Specifically, the radius of curvature at the curved surface of the recess 14*d* is larger than the radius of the lead portion (wire) 22, and the depth of the recess 14*d* from the top surface 14*c* is smaller than the diameter of the lead portion (wire) 22.

The width of the recess 14*d* is determined depending on the width of the element body 10, and should be less than ⅓ of the width of the element body 10. The outer electrodes 12 are provided on the element body 10. The width of the recess 14*d* is determined depending on the thickness (diameter) of the wire, and should be at least three times the diameter of the wire. For example, if the outer electrode 12 is provided on the flange 14 and the width of the flange 14 is 0.5 mm, then the width of the recess 14*d* should be 0.16 mm or less. If the diameter of the wire is 0.02 mm, the width of the recess 14*d* should be 0.06 mm or more. In this way, even if the width of the flange 14 is 0.5 mm or less, the effect of preventing the wire from loosening can be obtained.

The wide and shallow structure of the recess 14*d* allows the flange 14 to have sufficient mechanical strength as compared to a flange that has a rectangular parallelepiped shape without the recess 14*d*. In other words, the drop in mechanical strength at the recess 14*d* is very small, i.e., the wide and shallow structure of the recess 14*d* prevents the flange 14 from losing mechanical strength as compared to a rectangular parallelepiped shape without the recess 14*d*. Also, the wide and shallow structure of the recess 14*d* can suppress the influence of the presence of the recess 14*d* on downsizing of the element body 10. For example, a sufficient size of the winding portion 21 can be ensured. Furthermore, the wide and shallow structure of the recess 14*d* allows a part of the joint portion 23 to hang on (hook to) the recess 14*d*, and the joint portion 23 closer to the lead portion 22 deforms along the recess 14*d*, thereby avoiding the large deformation of the lead portion 22. Because a part of the joint portion 23 hangs on (hooks to) the recess 14*d*, a sufficient area of the joint portion 23 necessary for joining is ensured. Furthermore, the wide and shallow structure of the recess 14*d* allows the lead portion 22 to have a longer contact length (area) with the curved surface of the recess 14*d*. This stabilizes the position of the lead portion 22. Furthermore, the joint portion 23 is provided at a distance from the inner surface 14*a*, which allows the lead portion 22 to be positioned without being affected by the formation of the joint portion 23.

Although not shown in FIG. 10A, FIG. 10B, FIG. 11A, and FIG. 11B, the top surface 14*c* and the recess 14*d* are connected to each other by a continuous curved surface, i.e., the boundary (edge) between the top surface 14*c* and the recess 14*d* is rounded. Also, the recess 14*d* and the inner surface 14*a* are connected to each other by a continuous curved surface with the boundary (edge) being rounded. The rounded edges reduce damage to the wire.

As shown in FIG. 11A and FIG. 11B, the position of the lead portion 22 near the boundary where the recess 14*d* connects to the top surface 14*c* is determined depending on the position of the joint portion 23.

Figure 12A:
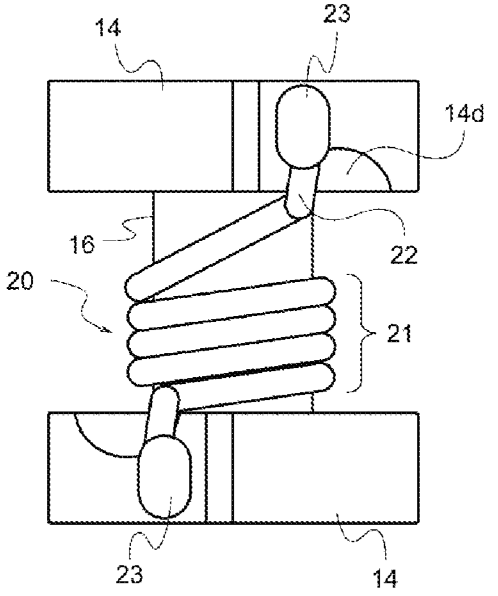
FIG. 12A shows a modification to the first embodiment in which a location of a joint portion is altered.
Figure 12B:
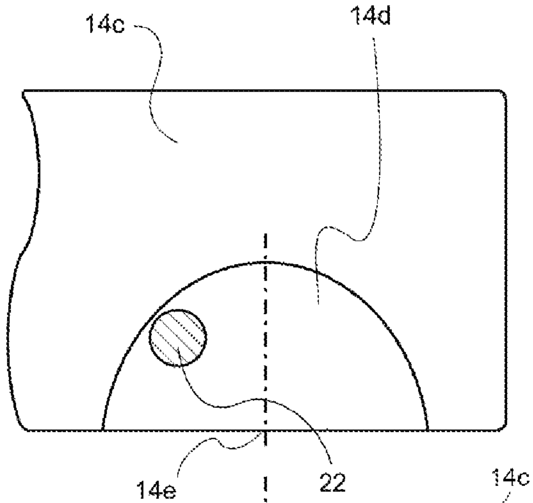
FIG. 12B is similar to FIG. 11A and shows a top view of the recess together with the lead portion hanging in the recess of the modification shown in FIG. 12A.
Figure 12C:
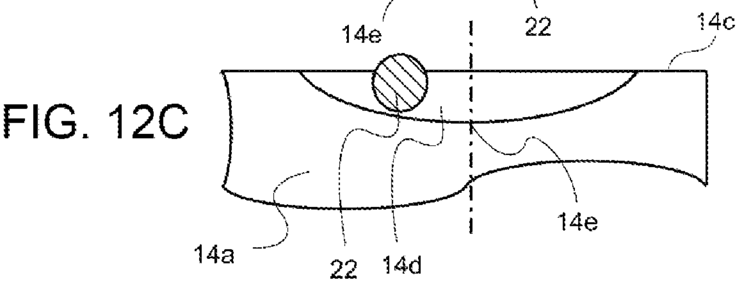
FIG. 12C is similar to FIG. 11B and shows a left side view of the recess together with the lead portion hanging in the recess of the modification shown in FIG. 12A.

FIG. 12A shows a modification that has the joint portions 23 at different positions from the configuration shown in FIG. 6. FIG. 12B is similar to FIG. 11A and shows a top view of the recess together with the lead portion hanging in the recess of the modification shown in FIG. 12A. FIG. 12C is similar to FIG. 11B and shows a left side view of the recess together with the lead portion hanging in the recess of the modification shown in FIG. 12A.

In the modified configuration shown in FIG. 12A, each of the joint portions 23 is located closer to the center of the flange 14. In this configuration, each of the lead portions 22 is positioned by the associated recess 14*d*, and the lead portion 22 bends at a point where it hangs over the recess 14*d*.

As understood from comparison between FIG. 12B and FIG. 11A, the position of the upper end of the lead portion 22 near the boundary between the recess 14*d* and the top surface 14*c* of the modification (FIG. 12B) is different from that shown in FIG. 11A. However, as understood from comparison between FIG. 12C and FIG. 11B, the position of the lead portion 22 near the boundary between the recess 14*d* and the inner surface 14*a* is not much affected by the position of the joint portion 23, i.e., the position of the lead portion 22 is shifted toward the starting point of the lead portion 22 (left in the drawing) relative to the apex 14*e* of the boundary between the recess 14*d* and the inner surface 14*a* (a point farthest from the top surface 14*c*) in both FIG. 12C and FIG. 11B. Therefore, the position of each of the lead portions 22 is stabilized and the performance of the coil component 1 is also stabilized.

Figure 13:
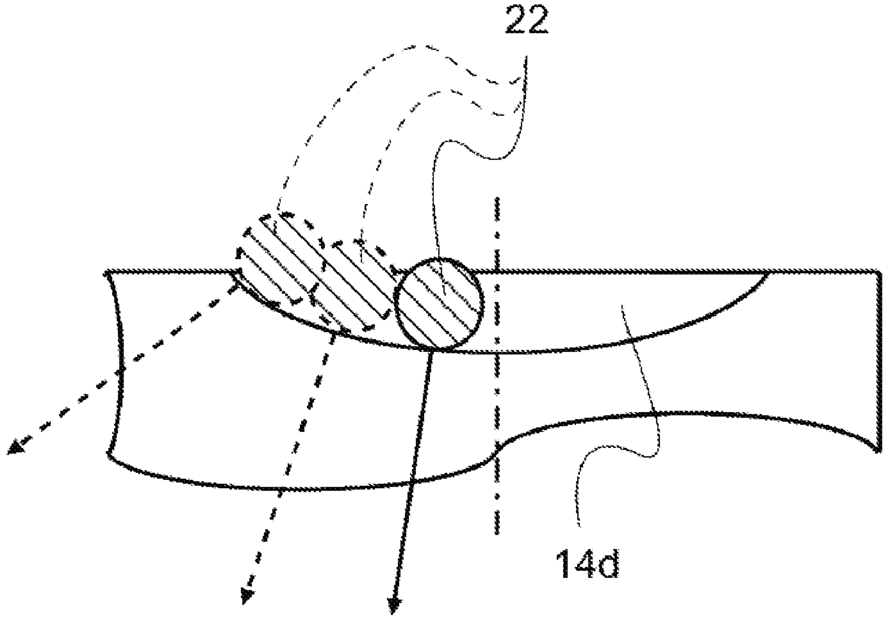
FIG. 13 shows the position of the lead portion in the recess when a starting point of the lead portion is altered.

FIG. 13 shows the position of the lead portion 22 hanging in the recess 14*d* when the starting point of the lead portion 22 is changed. FIG. 13 shows the position of the lead portion 22 as viewed toward the inner surface 14*a*.

The number of turns, number of steps, and the diameter (thickness) of the wire in the winding portion 21 are changed depending on changes in the specifications required for the coil component 1. As a result, the starting point of the lead portion 22 changes, i.e., a point from which the lead portion 22 is drawn from the winding portion 21 changes. The multiple locations of the lead portion 22 shown in FIG. 13 correspond to different starting points of the lead portion 22.

When the starting point of the lead portion 22 is different, the direction of tension applied to the lead portion 22 is different, as shown by the arrows in FIG. 13. Thus, the lead portion 22 is moved to a stable position in the recess 14*d* along the continuous curve of the edge of the recess 14*d*, i.e., the lead portion 22 is positioned in accordance with the direction of tension applied to the lead portion 22. As a result, the lead portion 22 connects the winding portion 21 to the joint portion 23 by the shortest possible distance, and loosening of the winding portion 21 and the lead portion 22 is suppressed or avoided regardless of the starting point of the lead portion 22. This stabilizes or enhances the performance of the coil component 1.

The continuous curve of the edge of the recess 14*d* can fit (smoothly contact) a wide range of wires of different thicknesses (diameter). Thus, even if the wire thickness is changed, the size of the recess 14*d* can remain unchanged without degrading the stable performance of the coil component 1.

Method of Manufacturing the Element Body

The following is a description of a method of manufacturing the element body 10 having the recesses 14*d* in the flanges 14.

FIG. 14A to FIG. 14D show, in combination, an example of how the element body 10 is manufactured.

FIG. 14A is similar to FIG. 3 and shows a cross-sectional view of the element body 10. FIG. 14B is a cross-sectional view of the element body 10 taken along the line XIVB-XIVB in FIG. 14A. FIG. 14C is a view from the inside, showing the shape of a mold 30 that conforms to the element body 10 shown in FIG. 14A. FIG. 14D is a lateral view showing the shape of the mold 30 that conforms to the element body 10 show in FIG. 14B.

The element body 10 is made, for example, in the following manner. Firstly, mixing the above-mentioned magnetic or nonmagnetic material powders with a lubricant to obtain a mixed material. Secondly, loading the mixed material into a cavity of the mold 30. Thirdly, carrying out press-molding to produce a compact. Finally, heat-treating the compact to obtain the element body 10. Alternatively, the element body 10 may be made by another method. Specifically, the method may include a step of mixing the above-mentioned magnetic or nonmagnetic material powders with resin, glass, or insulating oxides (e.g., Ni—Zn ferrite or silica) to obtain a mixed material, a step of molding the mixed material, and a step of heat treating the molded material. The heat treatment may be performed by thermosetting at a temperature of 200 degrees C. or lower or sintering at a temperature of 600 degrees C. or higher, depending on the raw materials used.

The mold 30 is provided with a convex portion 31 corresponding to the concave portion 14*d* of the flange 14. Thus, the concave portion 14*d* of the flange 14 is formed by press-molding with the mold 30. The convex portion 31 may form the approximate shape of the concave portion 14*d*. As mentioned above, since the concave portion 14*d* has a wide, shallow, and continuous curved surface, the convex portion 31 has a wide, low and continuous surface convex shape. As a result, the structure of the mold 30 is simpler and the molding process to form the concave portion 14*d* is carried out in a stable manner. Because the element body 10 is made using the mold 30 that has the convex portion 31, it ensures the stable production of the concave portion 14*d* in the flange 14.

Figure 15A:
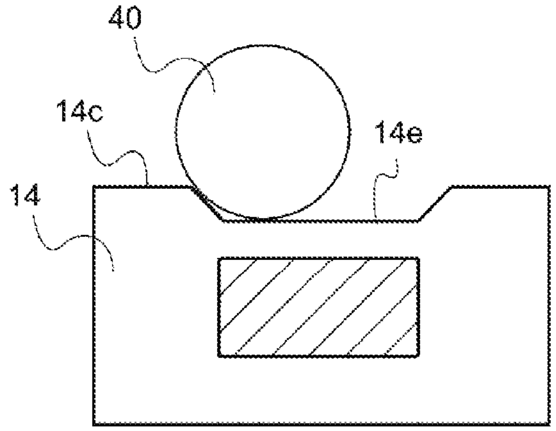
FIG. 15A shows a cross-sectional view of the element body, taken along the line XVA-XVA in FIG. 15B, after heat treatment during another method of making the element body.
Figure 15B:
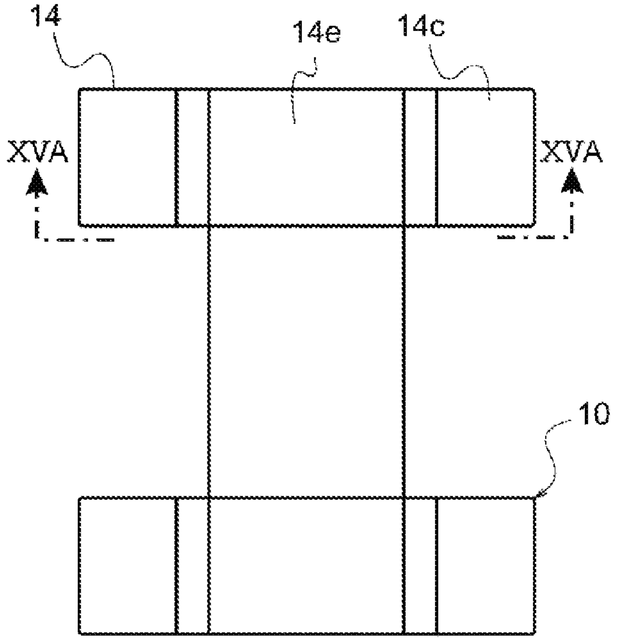
FIG. 15B shows a top view of the element body shown in FIG. 15A.
Figure 16A:
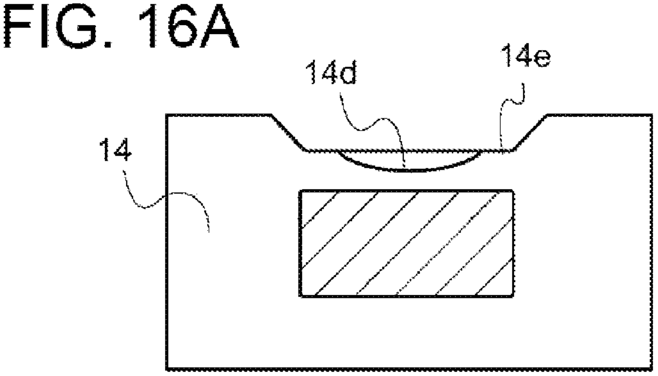
FIG. 16A shows a cross-sectional view of the element body of FIG. 15A after barrel polishing, taken along the line XVIA-XVIA in FIG. 16B.
Figure 16B:
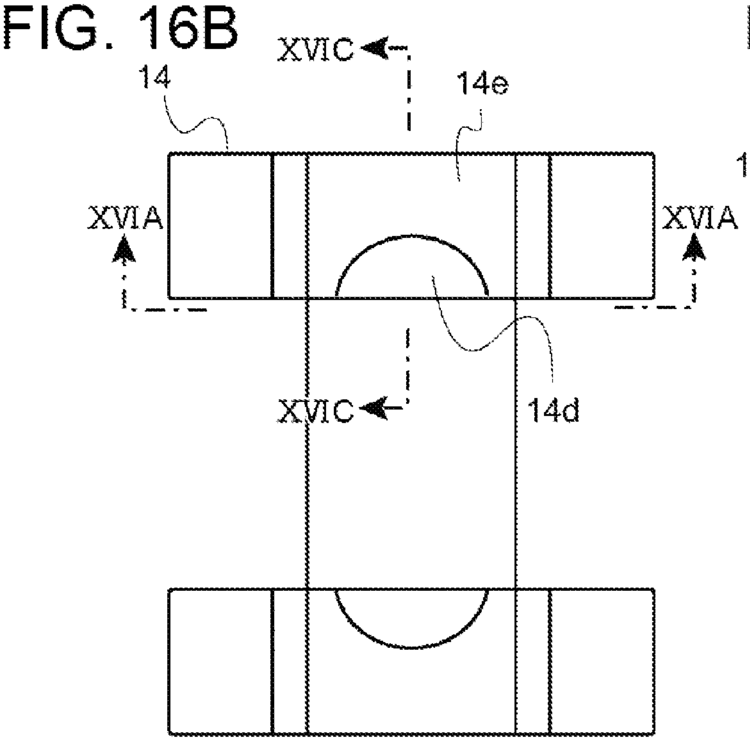
FIG. 16B shows a top view of the element body shown in FIG. 16A.
Figure 16C:
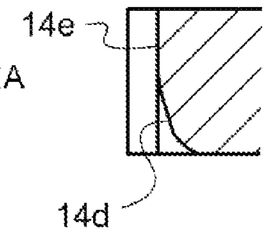
FIG. 16C shows a cross-sectional view of the element body, taken along the line XVIC-XVIC in FIG. 16B.

FIGS. 15A, 15B, 16A, 16B, and 16C show, in combination, another exemplary method of manufacturing the element body 10. FIG. 15A shows a cross-sectional view, taken along the line XVA-XVA in FIG. 15B. FIG. 15B shows a top view. FIG. 16A shows a cross-sectional view, taken along the line XVIA-XVIA in FIG. 16B. FIG. 16B shows a top view. FIG. 16C shows a cross-sectional view, taken along the line XVIC-XVIC in FIG. 16B.

In the method shown in FIG. 15A to FIG. 16C, recesses 14*d* are formed in the flanges 14 by barrel polishing after the heat treatment. FIG. 15A and FIG. 15B show the element body 10 after the heat treatment, and FIG. 16A to FIG. 16C show the element body 10 after the barrel polishing.

As shown in FIG. 15A and FIG. 15B, two lower areas 14*e* are formed in the top surfaces 14*c* of the two flanges 14 respectively at those locations where the recesses 14*d* will be formed later. The structure shown in FIG. 15A and FIG. 15B is obtained by press-molding and heat treatment. Then, an abrasive (polishing material) 40 that has a size corresponding to the size of the recess 14*d* is selected and the barrel polishing is applied on the element body 10 after heat treatment. The barrel polishing selectively processes the low-level portion 14*e*. Ultimately, as shown in FIG. 16A to FIG. 16C, the recess 14*d* is formed in each of the flanges 14. Forming the recess 14*d* by barrel polishing is easier than molding by the die 30.

Figure 17:
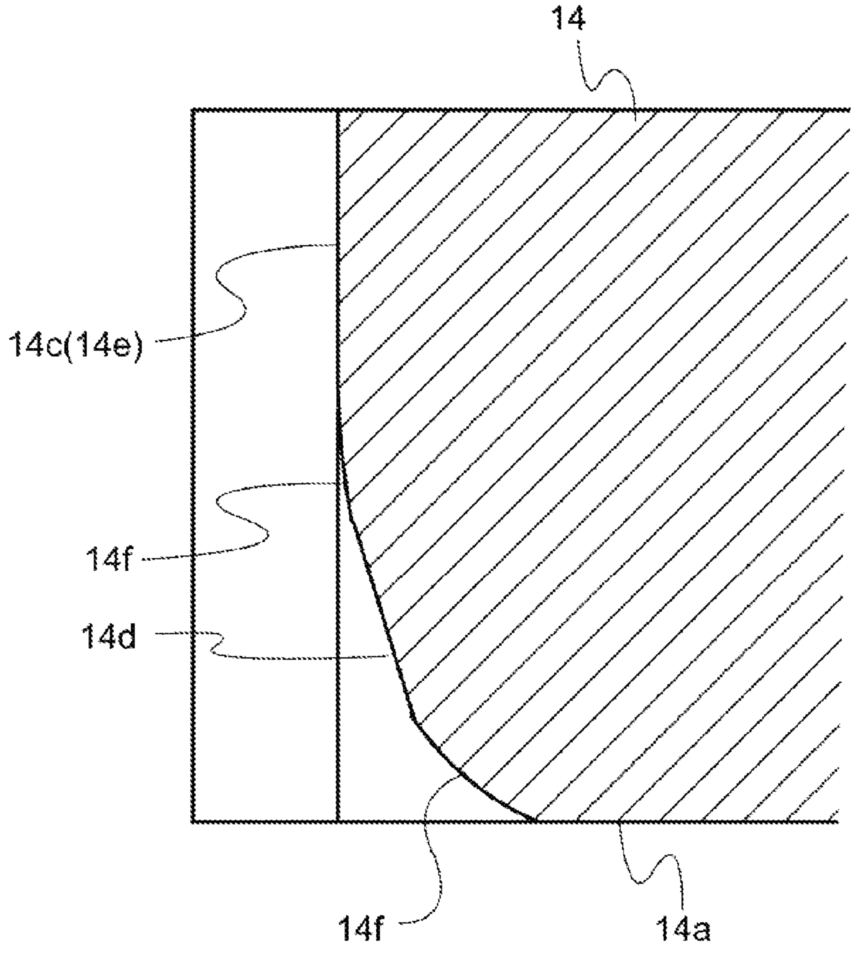
FIG. 17 is an enlarged view of FIG. 16C.

FIG. 17 is an enlarged view of the structure shown in FIG. 16C.

The recess 14*d* formed by barrel polishing connects (extends) to the top surface 14*c* (the low level 14*e*) and the inner surface 14*a*, respectively, by a continuous curved surface 14*f*, with the edges being rounded. Since the edges are naturally rounded by barrel polishing, damage to the wire is low, which is desirable.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed:

1. A coil component comprising:

an outer electrode;

an element body including a first surface on which at least a portion of the outer electrode is located, a second surface immediately adjacent to the first surface, and a core portion extending from the second surface in an axial direction of the core portion, wherein the first surface is a flat surface having a higher area and a lower area along a ridge line between the first surface and the second surface, and a recess having an inwardly curved concaved surface is formed in a manner of replacing a portion of a ridge line between the lower area of the first surface and the second surface; and a conductor including a winding portion that extends around a periphery of the core portion of the element body, a junction portion that is electrically joined to the outer electrode in the lower area of the first surface, and a lead portion that passes through the recess and connects one end of the winding portion to the junction portion via the recess.

2. The coil component according to claim 1, wherein a boundary where the recess connects to at least one of the first and second surfaces is curved.

3. The coil component according to claim 1, wherein the recess is larger in size when viewed toward the first surface than when viewed toward the second surface.

4. The coil component according to claim 1, wherein the conductor comprises a wire, and a radius of curvature at the curved concaved surface of the recess is greater than a radius of the wire.

5. The coil component according to claim 1, wherein the conductor comprises a wire, and a depth of the recess from the first surface is smaller than a diameter of the wire.

6. The coil component according to claim 1, wherein a boundary where the recess connects to the second surface is curved, and the lead portion passes over the boundary of the recess at a position shifted toward a starting point of the lead portion on the winding portion with respect to a farthest point of the boundary from the first surface as viewed in the axial direction of the core portion.

7. The coil component according to claim 1, wherein the conductor comprises a wire of 0.02 mm or less in diameter.

8. The coil component according to claim 1 further comprising a second outer electrode, wherein the element body further includes another first surface on which at least a portion of the second outer electrode is located, another second surface immediately adjacent to said another first surface, wherein the core portion extending from the another second surface in the axial direction of the core portion, and the another first surface is a flat surface having a higher area and a lower area along a ridge line between the another first surface and the another second surface, and another recess having an inwardly curved concaved surface is formed on a distal end of the core portion in a manner of replacing a portion of a ridge line between the lower area of said another first surface and said another second surface, and the conductor has another junction portion that is electrically connected to the second outer electrode in the lower area of said another first surface, and another lead portion that passes through said another recess and connects another end of the winding portion to said another junction portion via said another recess.

9. The coil component according to claim 8, wherein the recess and said another recess are arranged in rotational symmetric positions.

10. A circuit board arrangement comprising:

a coil component according to claim 1; and a board on which the coil component is mounted by solder joints through the outer electrode.

11. An electronic device comprising the circuit board arrangement according to claim 10.

12. The coil component according to claim 1, wherein the higher area and the lower area are defined on planes parallel to each other.

13. A coil component comprising:

an outer electrode;

an element body including a first surface on which at least a portion of the outer electrode is located, a second surface immediately adjacent to the first surface, and a core portion extending from the second surface in an axial direction of the core portion, wherein a recess having an inwardly curved concaved surface is formed in a manner of replacing a portion of a ridge line between the first surface and the second surface; and a conductor including a winding portion that extends around a periphery of the core portion of the element body, a junction portion that is electrically joined to the outer electrode in the first surface, and a lead portion that passes through the recess and connects one end of the winding portion to the junction portion via the recess.

* * * * *